United States Patent
Hamel et al.

(10) Patent No.: US 10,359,804 B2
(45) Date of Patent: Jul. 23, 2019

(54) COLD SPRAY OF STAINLESS STEEL

(71) Applicant: Apple Inc., Cupertino, CA (US)

(72) Inventors: Bradley J. Hamel, Redwood City, CA (US); Simon Regis Louis Lancaster-Larocque, Gloucester (CA); Steven J. Osborne, San Jose, CA (US); Adam T. Garelli, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 70 days.

(21) Appl. No.: 14/572,595

(22) Filed: Dec. 16, 2014

(65) Prior Publication Data

US 2015/0248958 A1    Sep. 3, 2015

Related U.S. Application Data

(60) Provisional application No. 61/947,350, filed on Mar. 3, 2014.

(51) Int. Cl.
| | | |
|---|---|---|
| *G06F 1/16* | (2006.01) | |
| *B23K 1/00* | (2006.01) | |
| *B23K 31/02* | (2006.01) | |
| *G06F 1/18* | (2006.01) | |
| *H01F 1/18* | (2006.01) | |
| *H01F 41/00* | (2006.01) | |

(52) U.S. Cl.
CPC .......... *G06F 1/1616* (2013.01); *B23K 1/0016* (2013.01); *B23K 31/02* (2013.01); *G06F 1/1656* (2013.01); *G06F 1/1679* (2013.01); *G06F 1/182* (2013.01); *H01F 1/18* (2013.01); *H01F 41/005* (2013.01)

(58) Field of Classification Search
CPC ....... G11B 5/743; G11B 5/746; H01F 7/0221; H01F 7/0273; H01F 3/12; B23K 31/0016; H05K 5/069; H05K 5/0239; H05K 5/04; H05K 5/06; H05K 5/065; G06F 1/1633; G06F 1/1679; G06F 1/181; G06F 1/16
USPC ........ 361/142, 625; 427/127, 128, 129, 130, 427/131, 132
See application file for complete search history.

(56) References Cited

U.S. PATENT DOCUMENTS 5,108,812 A * 4/1992 Takahashi ............ G11B 5/7305
                                                           204/192.1
5,893,526 A * 4/1999 Zwettler .......... G11B 23/08757
                                                              242/342

(Continued)

FOREIGN PATENT DOCUMENTS

| JP | 03127328 | * 5/1991 |
| JP | 410283618 | * 10/1998 |
| KR | 2008099679 | * 11/2013 |

OTHER PUBLICATIONS

Jeganathan Karthikeyan, AMS Handbook, vol. 5A, Thermal Spray Technology (2013), 54-55.*

*Primary Examiner* — Tabassom Tadayyon Eslami
(74) *Attorney, Agent, or Firm* — Dickinson Wright RLLP

(57) ABSTRACT

The described embodiments relate generally to methods to form magnetic assemblies. In particular, extreme cold work (aka cold spray) is used to enhance magnetic properties of a steel alloy (most notably 316L stainless steel and others) that can then be formed into useful shapes and embedded within a substrate without undue machining operations.

18 Claims, 6 Drawing Sheets

(56) References Cited

U.S. PATENT DOCUMENTS

| | | | | |
|---|---|---|---|---|
| 6,264,848 B1 * | 7/2001 | Belser | ................ | G11B 5/00 |
| | | | | 216/22 |
| 2002/0105401 A1 * | 8/2002 | Shih-Chung | ............ | G06F 1/162 |
| | | | | 335/207 |
| 2002/0182311 A1 * | 12/2002 | Leonardi | ................ | H01F 41/16 |
| | | | | 427/128 |
| 2004/0142198 A1 * | 7/2004 | Van Steenkiste | ....... | C23C 24/04 |
| | | | | 428/553 |
| 2005/0018393 A1 * | 1/2005 | Kuo | ................ | G06F 1/1616 |
| | | | | 361/679.58 |
| 2005/0141350 A1 * | 6/2005 | Kim | ................ | B82Y 10/00 |
| | | | | 369/13.35 |
| 2006/0061900 A1 * | 3/2006 | Ohtsuka | ................ | G11B 5/743 |
| | | | | 360/69 |
| 2006/0132984 A1 * | 6/2006 | Kajiyama | ............... | B82Y 10/00 |
| | | | | 360/317 |
| 2006/0204794 A1 * | 9/2006 | Kikuchi | ................ | B82Y 10/00 |
| | | | | 428/836.2 |
| 2008/0106821 A1 * | 5/2008 | Lim | ................ | B82Y 10/00 |
| | | | | 360/135 |
| 2009/0297701 A1 * | 12/2009 | Jabado | ................ | B23P 6/007 |
| | | | | 427/142 |
| 2010/0195249 A1 * | 8/2010 | Tsuda | ................ | B82Y 10/00 |
| | | | | 360/135 |
| 2012/0032289 A1 * | 2/2012 | Ohmori | ................ | H01L 27/228 |
| | | | | 257/427 |

* cited by examiner

COLD SPRAY OF STAINLESS STEEL

CROSS-REFERENCE TO RELATED APPLICATION

This application claims priority to U.S. Provisional Application Ser. No. 61/947,350 filed Mar. 3, 2014 entitled "Cold Spray of Stainless Steel," which is incorporated herein by reference in its entirety.

FIELD

The described embodiments relate generally to a deposition process. In particular, the present embodiments relate to a solid state deposition process of metallic particles.

BACKGROUND

It is known that stainless steels are generally non-magnetic in nature but can be rendered magnetic (or at least partially magnetic). More specifically, cold working of austenitic stainless steels, such as 316L, can partially transform austenite that is known to be generally non-magnetic to martensite that is generally known to be ferromagnetic.

However, even though austenitic stainless steels can become partially magnetic, the improved magnetic properties are generally not sufficient for the cold worked stainless steel to be considered useful. Moreover, the nature of the cold worked stainless steel is such that any magnetic application that would require a strong magnetic force would by necessity require a strong magnetic source, such as neodymium magnets, that are expensive and hard to work.

SUMMARY

This paper describes various embodiments that describe using extreme cold working (solid state deposition, aka cold spray) to enhance magnetic properties of materials such as austenitic stainless steel. The enhanced magnetic properties of the extreme cold worked austenitic stainless steel opens up the possibility of manufacturing results heretofore not easily achievable.

In one aspect, a method for forming a magnetic assembly within a substrate formed of a first non-magnetic material is described. The method may include forming a magnetic shunt using a first solid state deposition by depositing a layer of a ferromagnetic material within a recess located at a first surface of the substrate. The method may further include placing a magnet that provides a magnetic field into the recess in relation to the magnetic shunt such that the magnetic shunt redirects the magnetic field in a desired direction. The method may further include enclosing the magnet and the magnetic shunt within the substrate using a second solid state deposition that fills in a remaining portion of the recess with a second non-magnetic material.

In another aspect, the magnetic assembly can be formed by depositing a layer of ferromagnetic material using a first solid state deposition process at a first surface of the recess. The magnetic body can then be placed adjacent the layer of ferromagnetic material (now the magnetic shunt) to form the magnetic assembly. The magnetic assembly can then be embedded within the housing using a second solid state deposition process to fill in a remaining portion of the recess with material corresponding to the housing. For example, the second solid state deposition process may include aluminum to form a consistent appearance with that of the housing.

In another aspect, an assembly that is resistant to the formation of eddy currents when exposed to a high frequency magnetic field is disclosed. The assembly can include layers of magnetic material that exhibit high electrical resistance interleaved with layers of non-conducting material. The interleaving of these layers has an overall effect of high magnetic coercivity and low electrical conductance. In this way, the assembly can be used in situations of high frequency magnetic fields without the undue effects caused by formation of eddy currents. In one embodiment, the assembly includes thin layers of steel having the desired magnetic and electrical characteristics.

In another aspect, magnetic circuits, each of which include a source magnet and corresponding attraction element, can be distributed based upon a desired location, size, shape and function. The magnetic circuits can be distributed along a lid/base of a laptop computer providing for reduced individual magnetic strength but an overall increased magnetic attraction. The distributed magnetic circuits can provide an increase in overall magnetic attraction with individual magnets of reduced size or reduced magnetization.

In another aspect, a structure capable of performing multiple functions can be formed using solid state deposition. The structure can be formed using solid state depositing of a layer of material such as steel at locations such as corners. The layer of steel can be embedded within the housing or formed as a layer on a surface of the housing. In one embodiment, the layer of steel is used as an attraction plate as well as a reinforcing member well suited for protecting the housing from drop events. For example, a corner member can be formed by depositing a layer of steel at the corner.

In another aspect, a structure formed of a target material can be cold sprayed onto a substrate to form an external layer. In some cases, the target material is formed from a material such that when the substrate and the target material undergo a chemical process, the target material cannot survive. However, using additional processes, the mechanical or thermal properties of the substrate can be augmented while maintaining a cosmetic appearance and mechanical functions of the external layer. For example, a first cold spray operation (described above) can be used to form a layer of target material, such as steel, on a surface of aluminum (or any other suitable material). A second cold spray operation can be used to form an isolation layer that encapsulates the layer of target material in order to prevent direct interaction between the layer of target material and any subsequent processes, such as processes related to the formation of an oxide layer. The isolation layer can be formed from materials such as aluminum that will form an aluminum oxide layer. An optional removal operation can be used to remove some or the entire isolation layer to reveal corresponding portions of the layer of target material. Despite the removal operation, the appearance of continuity of the oxide layer and, for example, the substrate, can remain intact as the target material can remain fully embedded within the oxide layer. Alternatively, in other embodiments, the isolation layer is formed of materials such as titanium that will not form an oxide layer.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
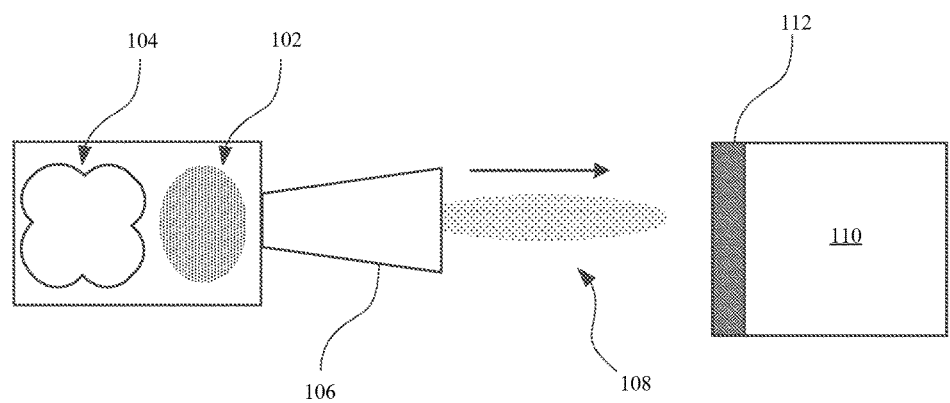
FIG. 1 illustrates a simplified representation of a cold spray process, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The described embodiments relate generally to solid state deposition (also referred to as cold spray). In particular, solid state deposition methods, apparatuses, and systems can be used to apply a layer of ferromagnetic material (such as stainless steel, including 316L SS) onto a substrate formed of a material dissimilar to that of the substrate. For example, the substrate can be an aluminum housing of an electronic device. It has been unexpectedly discovered that extreme cold working (such as solid state deposition, or cold spray) of a stainless steel can substantially enhance magnetic properties of the stainless steel. Through extreme cold work, austenitic stainless steel can be rendered sufficiently magnetic to be useful in many applications that would previously require iron, iron cobalt, or other ferromagnetic materials. Fairly inexpensive and easy to work, austenitic stainless steel can be cold sprayed into a variety of shapes and be used in a variety of situations that can take advantage of the enhanced magnetic properties. Conventional techniques of forming a magnetic attraction plate (e.g., formed from stainless steel) used to attract an opposing magnet require several conditions for a substrate to which the magnetic attraction plate is applied. For example, the substrate must be formed from a non-magnetic material (e.g., aluminum). Also, a portion of the substrate must be removed to form a recess for the magnetic attraction plate. The stainless steel attraction plate is then inserted into the recess and glued on to the substrate. It should be noted as well that in some applications, the formation of the recess is not needed as the attraction plate can be glued directly to the housing or other structure. In some cases, the stainless steel attraction plate is coated with a corrosion resistant layer such as nickel that can also enhance a cosmetic appearance. However, the corrosion resistant layer generally increases the distance between the magnetic attraction plate and the magnet, and since magnetic attraction has an inverse square relationship with distance, the net effect is a reduction in the magnetic force between the attraction plate and the magnet necessitating either a larger attraction plate or larger or stronger magnet which may lead to increased manufacturing costs.

However, by cold spraying stainless steel (1010 stainless steel, for example), an attraction plate can be formed directly on a surface of a substrate, or housing, without the need to form a recess or use an adhesive. It should also be noted (as described below with respect to a magnetic assembly) that an attraction plate can be embedded within the housing obviating the need for a corrosion resistant layer and also rendering the housing thinner than would otherwise be possible. One of the advantages to using cold spray is that the size, shape, locations, and functions of attraction plates can be widely varied. For example, attraction plates can be distributed about a perimeter of a lid of a laptop computer in locations corresponding to magnets in a housing of the laptop computer. In this way, the distributed nature of the resulting magnetic circuits provides a more uniform and overall stronger magnetic bond between housing and lid. Also, an amount of bowing observed when the lid is closed can be greatly reduced. In some cases, a layer of stainless steel can be formed using a cold spraying process at a location and having a size and shape on the housing. The resultant layer can act as both an attraction plate and a structural element. For example, a layer of stainless steel deposited at a corner location can be used as both an attraction plate and a corner reinforcement element well suited for preventing or at least reducing damage caused by a corner drop event. By distributing magnetic material around a laptop computer, the inherent magnetic strength of each magnet can be reduced but the overall effect may include a stronger magnetic attraction between the magnets and the cold sprayed attractions plates. Accordingly, magnets of reduced size and cost can be used.

A magnetic assembly may include a magnet (generally formed of ferromagnetic material such as magnetized iron, or a ceramic rare earth such as neodymium) attached to a shunt formed of ferromagnetic material (such as stainless steel). The shunt acts to redirect magnetic field lines from a direction away from the attraction plate in a direction towards the attraction plate. In this way, the number of magnetic field lines intersecting the attraction plate is increased resulting in a stronger attraction force per unit amount of magnet. The magnet and shunt are glued together and placed within a recess in the substrate. In some cases, the magnet is a sleep magnet placed within a housing at a location that can be detected by a corresponding sensor (such as a Hall Effect sensor, or HFX) in another location of the laptop computer, such as a lid. Since the sleep magnet can be embedded within the housing, the housing can be thinner than would otherwise be possible resulting in a smaller or thinner sleep magnet. In this way, using cheaper more readily available magnetic materials is possible.

In another embodiment, three dimensional reinforcement structures can be formed on a backside of a magnet using cold spraying techniques previously described. In this way, ferromagnetic material such as steel can be distributed and embedded within a housing. Since stainless steel has a high magnetic flux (B) saturation compared to neodymium (that has a high magnetic coercivity), the magnetic attraction between stainless steel and neodymium is stronger than that between neodymium magnets alone. Therefore, distributing stainless steel and magnets throughout the housing in locations in which the stainless steel and the magnets can form a magnetic circuit can enhance an overall magnetic performance. This feature can be particularly useful in situations where overall magnetic performance can be enhanced while concurrently reducing an overall size or weight of the housing.

In addition to forming structures within and on a substrate, cold spray techniques can provide for assembly of magnetic assemblies having a reduced propensity to forming eddy currents when exposed to a high frequency magnetic field. Eddy currents are generally defined as electric currents induced within conductors by a changing magnetic field in the conductor that can cause effects such as heating. In order to minimize eddy currents, the magnetic properties of a substrate should be enhanced with respect to the electrical conductivity of the substrate. One way to achieve the desired result is to use cold spray to form a substrate that has alternating layers of conducting material and non-conducting material. In this way, the overall propensity of the layered substrate to form eddy currents when subjected to a high frequency magnetic field can be well controlled due in part to the reduced proportion of electrical conductivity of the substrate.

A simplified diagram of the cold spray process is shown in FIG. 1. As illustrated, the cold spray process may include directing powder particles 102 and carrier gas 104, which may be heated, through nozzle 106. The resulting high-velocity particle-gas mixture 108 may be directed at substrate 110. The high-velocity particle-gas mixture 108 may cause high-kinetic energy particles, when impacting other particles, to join together with those particles. When the high-velocity particle-gas mixture 108 impacts substrate 110, a layer of deposited material 112 may form thereon as the particles plastically deform and bond to substrate 110. The thickness of the resulting layer of deposited material 112 can continue to build to the extent desired. Also, unlike other liquid-based depositions, the solid state deposition process defined by a cold spray still allows for the particles to be identifiable. That is, discrete, non-continuous particles joined together may still be individually identified.

One advantage of solid state deposition processes such as cold spray is that the material from which the powder particles are formed may be selected to define a desirable characteristic. For example, the material defining the powder particles may be selected to match the material defining the substrate. In some embodiments, substrate 110 is part of a computer housing formed from aluminum (e.g., Al-6063-T6), and powder particles 102 are formed from the same aluminum (e.g., AA6063-325 mesh/+10 microns or AA6063-325 mesh/+5 microns). However, as discussed below, differing materials may be selected in other embodiments.

The basic requirement for the powder particles 102 is that they must be able to flow through the nozzle. Cold spray is done almost exclusively with atomized powder. The atomization process generates spherical particulates which flow well through the nozzle. For cold spray, powder particles 102 generally include a diameter in the range of 5-50 μm to be effective in applications. Uniformity of the size of the powder particles is advantageous in that deposition rates increase with less variation in size. The solid state deposition (e.g., cold spray) process may be used in any of the embodiments below to form structures having various desired properties.

Figure 2A:
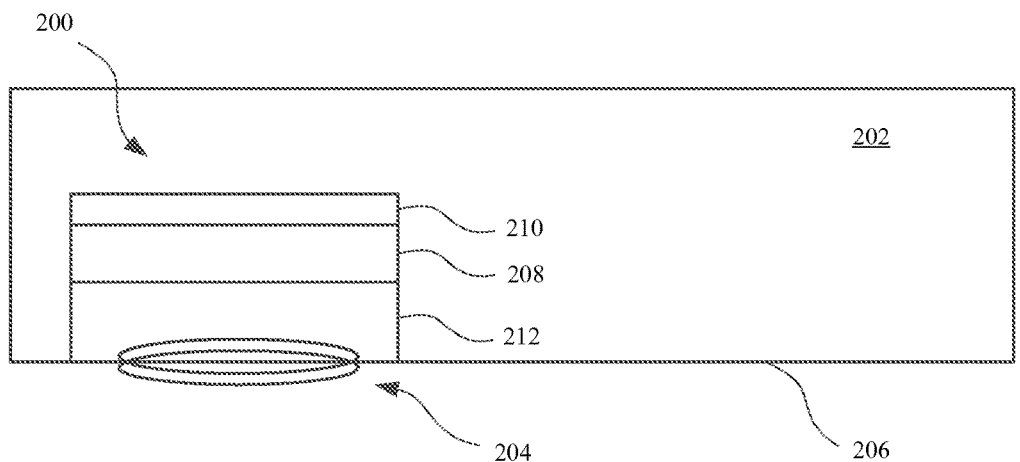
FIG. 2A illustrates an embodiment of an embedded magnetic assembly in accordance with the described embodiments.

FIG. 2A shows an embodiment of embedded magnetic assembly 200 in accordance with the described embodiments. Magnetic assembly 200 can be embedded within substrate 202 in a manner that creates magnetic surface 204 (i.e., magnetic field) at external wall 206 of substrate 202. Magnetic surface 204 can be used to complete a magnetic circuit with a corresponding magnetic element (not shown). The magnetic circuit can be used for many purposes, such as securing substrate 202 (such as a magnetic latch) or detecting that substrate 202 is in proximity to a sensor (not shown) that can be used to alter an operation of an electronic device (such as a sleep magnet and HFX sensor). Magnetic assembly 200 can include magnetic body 208 and magnetic shunt 210 used to re-direct magnetic field lines generated by magnetic body 208 in a direction towards external wall 206 thereby enhancing magnetic surface 204. Magnetic assembly 200 can be embedded within substrate 202 using a solid state deposition process. In some embodiments, the solid state deposition process includes a cold spray process previously described. As shown in FIG. 2A, substrate 202 includes layer 212 formed by solid state deposition. Also, in some embodiments, layer 212 is formed from a material similar to that of substrate 202. For example, layer 212 can be formed of aluminum. In other embodiments, however, layer 212 may be formed from a material different than that of substrate 202. Also, as shown in FIG. 2A, layer 212 may be substantially co-planar, or flush, with respect to external wall 206 of substrate 202.

FIG. 2A illustrates that magnetic assembly 200 can be formed by using a first solid state deposition process to form magnetic shunt 210 of magnetic material such as stainless steel or other iron alloys. After formation of magnetic shunt 210, magnetic body 208 can be placed in a position with respect to magnetic shunt 210 and exterior wall 206 to form magnetic surface 204. A second solid state deposition process can be used to form layer 212 used to embed magnetic assembly 200 within substrate 202. In some embodiments, layer 212 is formed from a material (or materials) substantially similar to that (or those) of substrate 202.

Figure 2B:
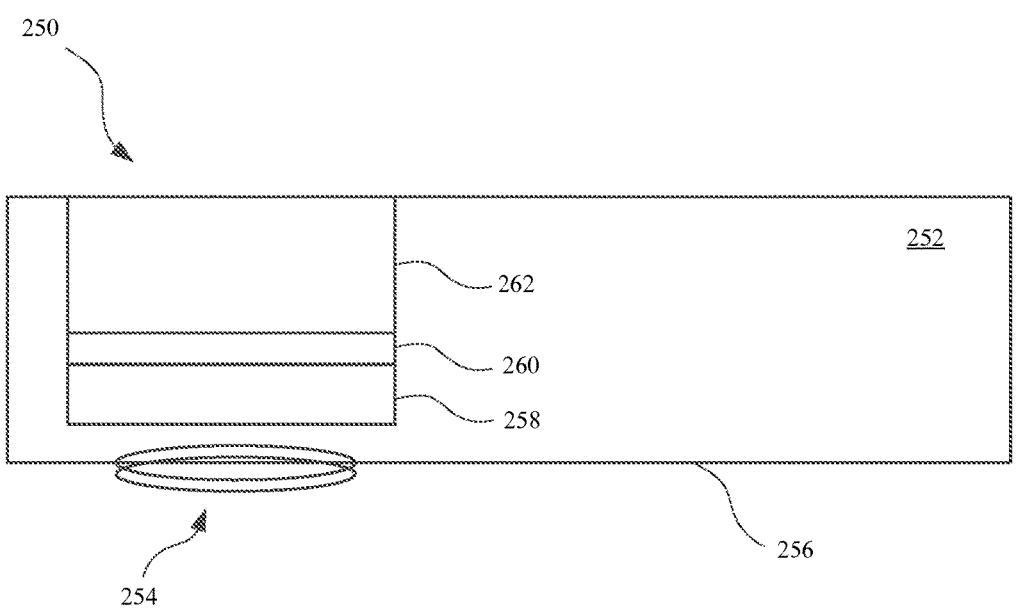
FIG. 2B illustrates an alternative embodiment of an embedded magnetic assembly in accordance with the described embodiments.

FIG. 2B illustrates an alternative embodiment of magnetic assembly 250 formed by using a first solid state deposition process to form magnetic shunt 260 of magnetic material such as stainless steel or other iron alloys adjacent to magnetic body 258. Magnetic body 258 is positioned to form magnetic surface 254 at exterior wall 256. After formation of magnetic shunt 260, magnetic assembly 250 can be embedded within substrate 252 using a second solid state deposition process with material corresponding to substrate 250. The second solid state process can be used to form layer 262 formed from a material or materials such that layer 262 includes a substantially similar appearance to that of substrate 252. In other words, substrate 252 includes an appearance of continuity in that layer 262 may "blend" with substrate 252 such that substrate 252 appears to be a continuous, undisturbed surface despite the presence of layer 262. The appearance of continuity may be due in part to a similar color, texture, and/or reflectivity of between substrate 252 and layer 262.

Figure 3:
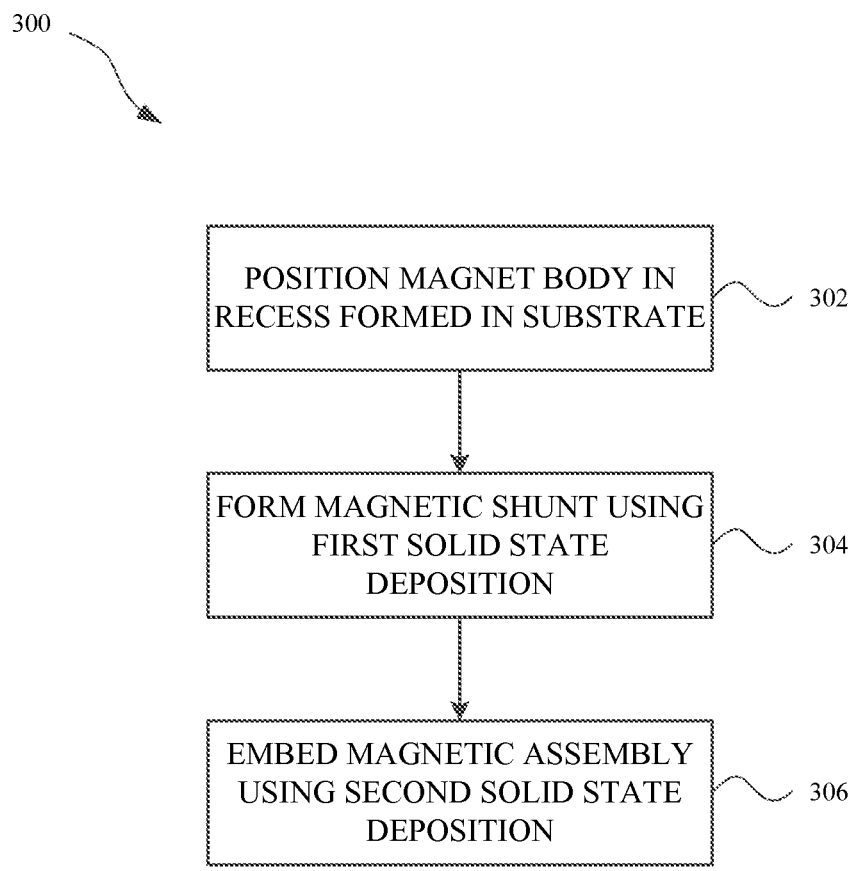
FIG. 3 illustrates a flowchart detailing a process for forming a magnetic assembly, in accordance with the described embodiments.

FIG. 3 shows a flowchart 300 detailing a process used to form a magnetic assembly, in accordance with the described embodiments. At step 302, the magnetic assembly can be formed by placing a magnetic body into a recess formed in a substrate. At step 304, a magnetic shunt is formed using a first solid state deposition process to form a layer of ferromagnetic material on a first side of the magnetic body. At step 306, the magnetic assembly is embedded within the substrate using a second solid state deposition process to fill in the recess with a material substantially similar to that of the substrate.

Figure 4:
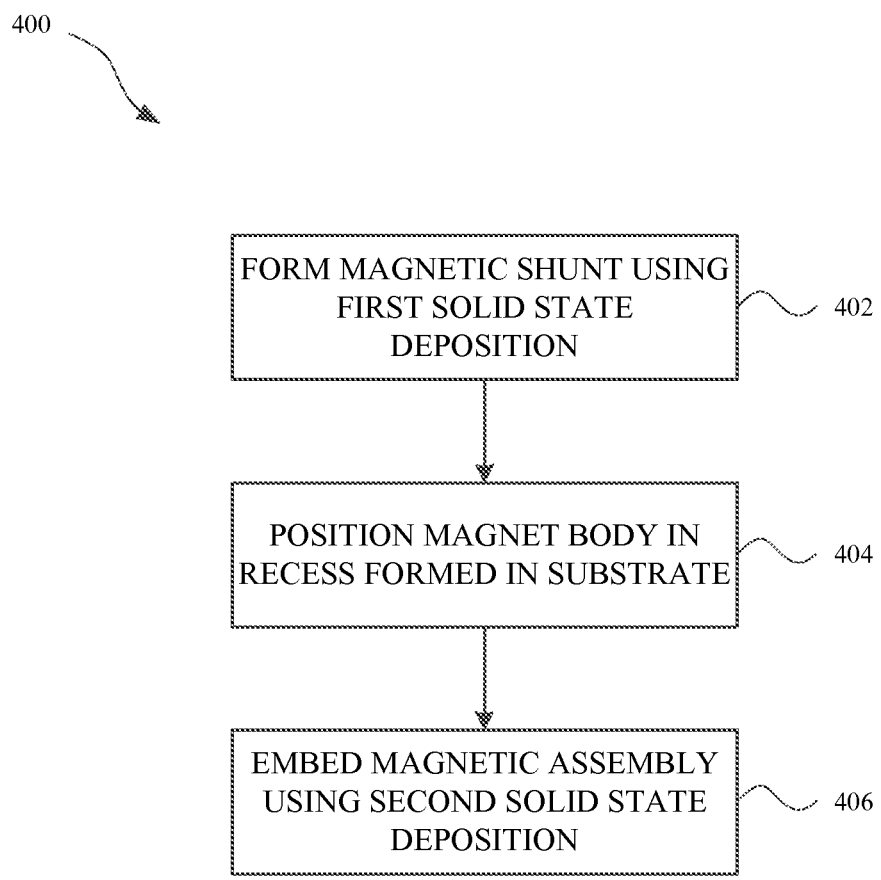
FIG. 4 illustrates a flowchart detailing an alternative process for forming a magnetic assembly, in accordance with the described embodiments.

FIG. 4 shows a flowchart 400 detailing an alternate process used to form a magnetic assembly, in accordance with the described embodiments. At step 402, the magnetic assembly can be created by forming a magnetic shunt at a first end of a recess using a first solid state deposition process. The magnetic shunt can be formed from a ferromagnetic material or materials. At step 404, a magnetic body can be placed into the recess in contact with the magnetic shunt. At step 406, the magnetic assembly is embedded within the substrate using a second solid state deposition process to fill in the recess with a material substantially similar to that of the substrate.

Figure 5:
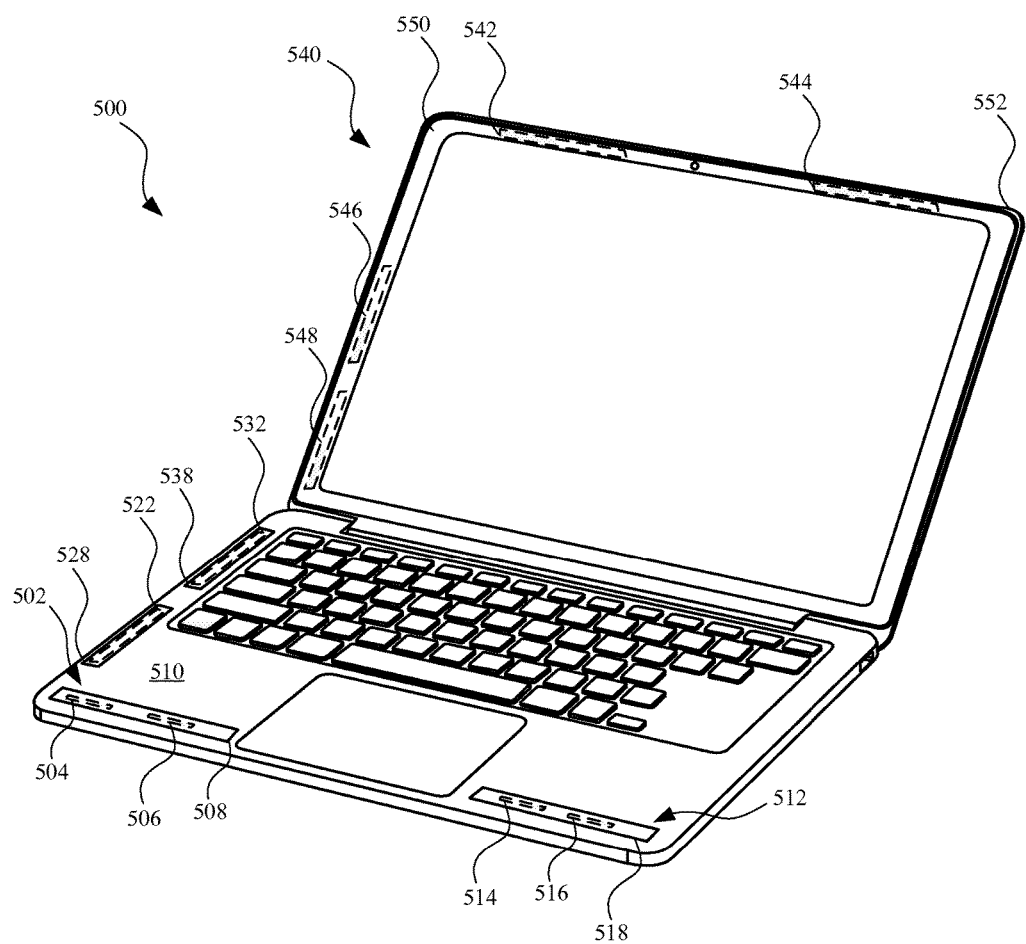
FIG. 5 illustrates a computing device having magnetic assemblies distributed about the computing device, in accordance with the described embodiments.

FIG. 5 illustrates computing device 500 having magnetic assemblies distributed about computing device 500 having substrate 510 pivotably coupled to lid portion 540, in accordance with the described embodiments. As shown, first magnetic assembly 502 includes first magnet 504 and second magnet 506 embedded in substrate 510 of computing device 500. Also, as shown, substrate 510 is a base portion of computing device 500. First magnetic assembly 502 may include magnetic shunts (not shown) secured to first magnet 504 and second magnet 506 in a manner similar to that shown in FIG. 2A or FIG. 2B. Also, the magnetic shunts may be formed by a cold spray operation that applies metallic particles to a surface of first magnet 504 and second magnet 506. The magnetic shunts may re-direct magnetic field lines from any one of the magnets in FIG. 5 in a direction toward a corresponding magnet. For example, when first magnet 504 includes a magnetic shunt, the magnetic field lines of first magnet 504 may be directed toward first attachment plate 542 (discussed below).

First magnetic assembly 502 may further include first layer 508 used to embed first magnet 504 and second magnet 506. In some embodiments, first layer 508 is formed from a cold spray operation that emits several metallic particles. In some embodiments, first layer 508 is formed from a material such that first layer 508 includes a substantially similar appearance to that of substrate 510. In this manner, substrate 510 includes an appearance of continuity in that substrate 510 appears to include a continuous surface when viewing first layer 508 and surrounding substrate 510. The similar appearance may be due to a similar color, material(s), reflectivity, or a combination thereof. Similarly, computing device 500 may further include second magnetic assembly 512 having third magnet 514 and fourth magnet 516, with both third magnet 514 and fourth magnet 516 embedded in substrate 510 by second layer 518. Second magnetic assembly 512 may include any property or properties previously described for first magnetic assembly 502. Also, second layer 518 may include any property or property previously described for first layer 508.

Additional magnetic assemblies may be included to provide additional magnetic attraction forces. For example, FIG. 5 shows computing device 500 having third magnetic assembly 522 and fourth magnetic assembly 532, embedded by third layer 528 and fourth layer 538, respectively. Third magnetic assembly 522 and fourth magnetic assembly 532 may include any property or characteristics as the magnetic assemblies previously described. Also, third layer 528 and fourth layer 538 may include any property or property previously described for a layer (e.g., first layer 508).

First magnetic assembly 502 and second magnetic assembly 512 can be used to provide a uniform magnetic circuit defined by a uniform magnetic attachment force between the attachment plates secured to lid portion 540 and magnets that form the aforementioned magnetic assemblies. For example, lid portion 540 may include first attachment plate 542 and second attachment plate 544. First attachment plate 542 and second attachment plate 544 may be formed from a magnetically attractable material or materials. In this manner, the attachment plates may magnetically couple with the magnets that form the magnetic assemblies. For instance, first attachment plate 542 is positioned in a manner such that first attachment plate 542 can magnetically couple to first magnet 504 and second magnet 506 when computing device 500 is in a closed configuration, i.e., when lid portion 540 is rotated in a direction toward substrate 510 such that lid portion 540 is proximate to substrate 510. In this case, "proximate to substrate 510" may refer to a condition in which an attachment plate (e.g., first attachment plate 542) is within a magnetic field line or lines of a magnet (e.g., first magnet 504). Also, computing device 500 may further include third attachment plate 546 and fourth attachment plate 548 configured to magnetically couple with third magnetic assembly 522 and fourth magnetic assembly 532, respectively. It should be noted that the magnets and magnetic assemblies may not be visible due in part to being embedded below a cold spray layer or behind an outer protective layer of lid portion 540. Regarding the latter, first attachment plate 542, second attachment plate 544, third attachment plate 546 and fourth attachment plate 548 may be positioned between outer protective layer 550 and enclosure 552, with both outer protective layer 550 and enclosure 552 being part of lid portion 540.

The uniform attachment force can also have an overall increased magnetic attachment force in spite of the fact that individual magnets within each magnetic assembly exhibit reduced magnetic attraction. More specifically, the magnetic assemblies shown in FIG. 5 can be well suited for use with computing device 500 by securing lid portion 540 to substrate 510 without undue bowing of lid portion 540. More specifically, with respect to FIG. 5, the magnetic assemblies can include individual magnets, such as first magnet 504, second magnet 506, third magnet 514, and fourth magnet 516, distributed and embedded within substrate 510. In the described embodiments, substrate 510 can take the form of a lid or a base of a laptop computer. However, substrate 510 as shown in FIG. 5 is a base portion. The number and location of the individual magnets correspond to the number and location of the attachment plates used to form magnetic circuits with the individual magnets. Since the individual magnetic circuits cumulatively add up to an overall magnetic attraction force, the size and strength of individual magnets can be reduced over that required for discreet magnetic assemblies. Further, the various magnets shown in FIG. 5 may differ in size. Similar, the various attachment plates shown in FIG. 5 may also differ in size.

In another embodiment, a structure formed of a target material can be cold sprayed onto a substrate. The substrate material can be one that undergoes a chemical process that the target material cannot survive. For example, in a process referred to as anodization, a layer of oxide is grown into a surface of a substrate of suitable material in accordance with various chemical and electrical interactions. However, since the formation of the oxide is very sensitive to any deviation in various process parameters (e.g., an interaction with unsuitable materials), isolation of any unsuitable target material from the process is essential for proper oxide layer formation. Accordingly, an isolation layer that encapsulates and isolates the target material can prevent any direct interaction between the process and the target material thereby alleviating any issues related to process degradation. In some embodiments, a cold spray operation forms the isolation layer. The isolation layer can be any material that is compatible with the process as one that does not adversely affect the underlying process (e.g., anodization). Materials that are essentially inert to the process should be used.

A specific example is one in which the substrate is formed of aluminum and the target material is steel. In order to form a layer of aluminum oxide on the surface of the aluminum substrate, the layer of steel should be isolated from any processes used to form the aluminum oxide layer. In order to isolate the steel layer from any subsequent oxide layer formation processes, a cold spray operation is used to encapsulate the steel layer in an isolation layer formed of a compatible material. The isolation layer can be formed of materials such as titanium that will not form an oxide layer or materials such as aluminum that will form an oxide layer. The choice of materials will depend upon the intended finish. In this way, once isolated, any subsequent chemical/electrical processes used to form the surface layer of aluminum oxide will not directly interact with the steel layer preserving both the final appearance of the aluminum oxide layer and the steel layer. An optional removal process can be used after completion of the aluminum oxide layer. The optional removal process can be used to remove selected portions of the isolation layer to reveal some or all of the target material. When the removal process is not performed, the steel layer can remain completely embedded within the isolation layer.

Figure 6:
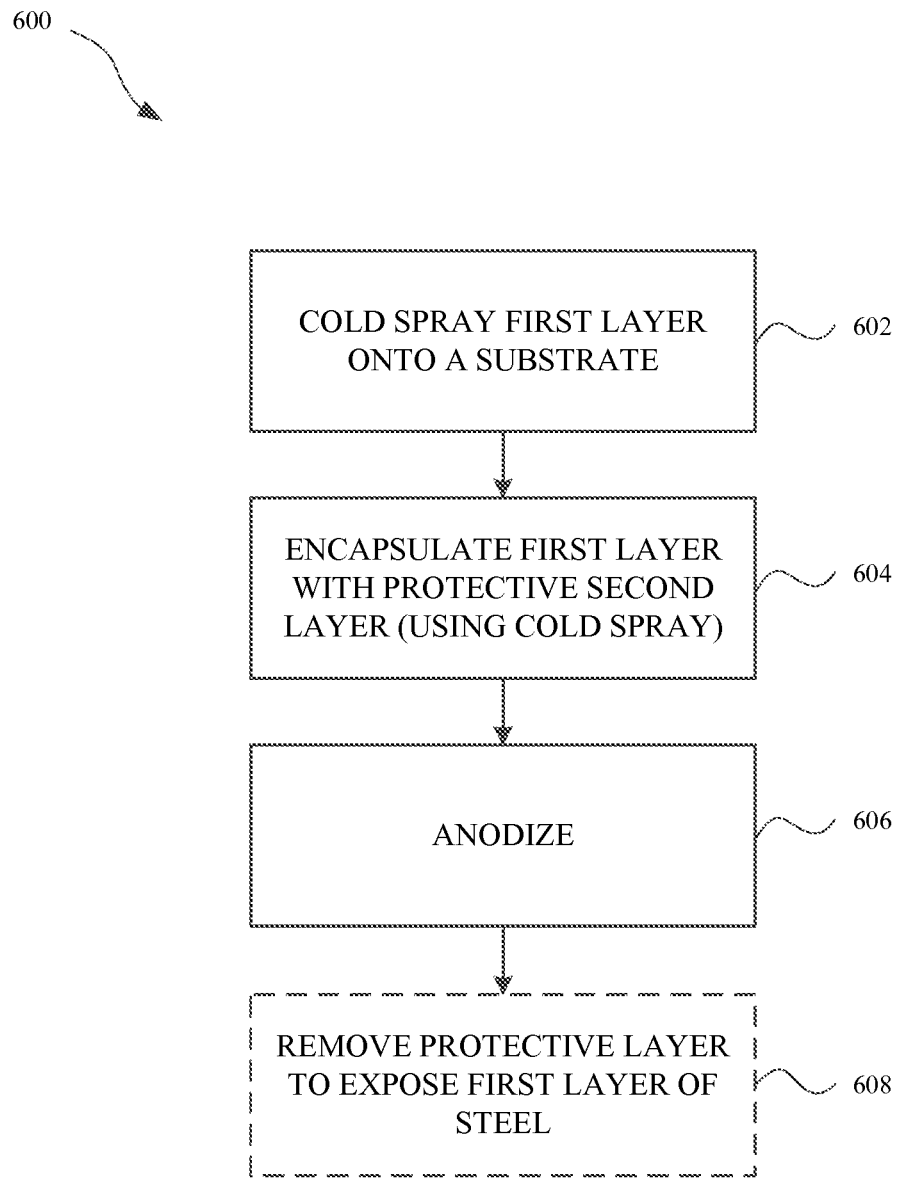
FIG. 6 illustrates a flowchart detailing a process for improving the appearance of an anodized surface having a steel feature, in accordance with the described embodiments.

FIG. 6 illustrates a flowchart 600 detailing a process for improving the appearance of an anodized surface having a steel feature, in accordance with the described embodiments. Steel is not generally considered a good material for anodization processes, as steel reacts with the various acids and/or electrolytic baths used for anodization. Therefore, in those situations where a steel feature is cold sprayed onto a substrate (such as aluminum) that will subsequently be anodized, the steel feature must be isolated from the anodization processes. At step 602, a first cold spray process is used to form a first layer on a substrate (or any substrate formed of a material suitable for anodization). In some embodiments, the first layer is formed from steel particles. Also, in some embodiments, the substrate is part of an aluminum housing of an electronic device.

At step 604, a second cold spray process is used to encapsulate the first layer within an isolation layer. The second cold spray process may include particles formed aluminum, titanium, or any other suitable material. At step 606, an anozidation process is performed on the substrate. The isolation layer is used to isolate the first layer from the anodization process. At step 608, an optional removal step can be carried out whereby at least some of the isolation layer can be removed to reveal a corresponding portion of the first layer.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method for forming a magnetic assembly within a wall of a housing of a portable electronic device, wherein the wall of the housing cooperates with at least one other wall of the housing to define a cavity capable of carrying an electronic component therein, and the wall of the housing is formed of a non-magnetic metal and includes (i) a recess at an external surface of the wall, and (ii) the recess terminates at a terminus surface, the method comprising:
    forming a layer of ferromagnetic material within the recess by using a first cold spray deposition process that includes depositing ferromagnetic particles onto at least the terminus surface;
    positioning a magnet within the recess and on the layer of ferromagnetic material, wherein a combined thickness of the layer of ferromagnetic material and the magnet is less than a depth of the recess; and
    forming a layer of non-magnetic material that (i) covers a surface of the magnet, and (ii) fills in a remaining portion of the recess using a second cold spray deposition process such that an external surface of the layer of non-magnetic material is co-planar with the external surface of the wall.

2. The method of claim 1, wherein the magnet is separated from the external surface of the wall by the layer of non-magnetic material, and the layer of non-magnetic material strengthens a rigidity of the wall.

3. The method of claim 1, wherein the layer of ferromagnetic material is confined within the recess.

4. The method of claim 1, wherein the external surface of the wall and the layer of non-magnetic material have a generally similar appearance.

5. The method of claim 1, wherein the layer of ferromagnetic material includes at least one of rare earth elements, iron cobalt, neodymium, stainless steel, steel or iron.

6. The method of claim 1, wherein the housing is pivotally coupled to a lid portion that carries a display.

7. The method of claim 1, wherein the layer of ferromagnetic material and the layer of non-magnetic material are substantially planar.

8. A method for forming a magnetic assembly within a wall of an enclosure for a portable electronic device, the wall cooperating with at least one other wall of the enclosure to define a cavity capable of carrying an electronic component therein, and the enclosure is formed of a non-magnetic material, the method comprising:

forming a recess that extends partially through the wall of the enclosure, and the recess ends at a terminus surface that is a distance from an opening of the recess;
positioning a magnet on at least the terminus surface and within the recess;
depositing a layer of ferromagnetic material within the recess and over a surface of the magnet by cold spraying ferromagnetic particles onto at least the terminus surface, wherein the layer of ferromagnetic material is capable of directing a magnetic field generated by the magnet towards an exterior surface of the enclosure; and
filling in a remainder of the recess with a layer of non-magnetic material that covers the surface of the magnet by cold spraying non-magnetic particles onto the layer of ferromagnetic material such that an external surface of the layer of non-magnetic material is co-planar with the exterior surface of the enclosure.

9. The method of claim 8, wherein, the non-magnetic material includes anodizable material, and the method further comprises:
anodizing the anodizable material.

10. The method of claim 8, wherein the wall and the at least one other wall are disposed along a periphery of the enclosure.

11. The method of claim 8, wherein the ferromagnetic material includes at least one of rare earth elements, iron cobalt, neodymium, stainless steel, steel or iron.

12. The method of claim 8, wherein the enclosure is pivotally coupled to a lid portion that includes a display.

13. The method of claim 8, wherein the magnet includes a magnetized iron, neodymium, or a rare earth magnet.

14. A method for forming a magnetic assembly within a wall of a housing for a portable electronic device, wherein the wall of the housing cooperates with at least one other wall of the housing to define a cavity capable of carrying an electronic component therein, and the housing is formed of a non-magnetic material, the housing including a recess that extends into the housing and is opposite of a terminus surface, the method comprising:

forming a layer of ferromagnetic material within the recess by using a first cold spray deposition process that includes depositing ferromagnetic particles onto at least the terminus surface;
positioning a magnet within the recess and that overlays a surface of the layer of ferromagnetic material; and
forming a layer of non-magnetic material that (i) covers a surface of the magnet and the layer of ferromagnetic material, and (ii) fills in a remaining portion of the recess by using a second cold spray deposition process, wherein an external surface of the layer of non-magnetic material is flush with a remaining external surface of the housing.

15. The method of claim 14, further comprising:
anodizing an external surface of the housing and the layer of non-magnetic material.

16. The method of claim 15, wherein the layers of non-magnetic material and ferromagnetic material are substantially planar.

17. The method of claim 14, wherein the ferromagnetic material includes at least one of rare earth elements, iron cobalt, neodymium, stainless steel, steel, or iron.

18. The method of claim 14, wherein the housing is pivotally coupled to a lid portion that carries a display.

* * * * *